May 5, 1931.  H. H. COBE  1,804,376
ELECTROMAGNETIC RECIPROCATING MECHANISM
Filed May 18, 1929  2 Sheets-Sheet 2
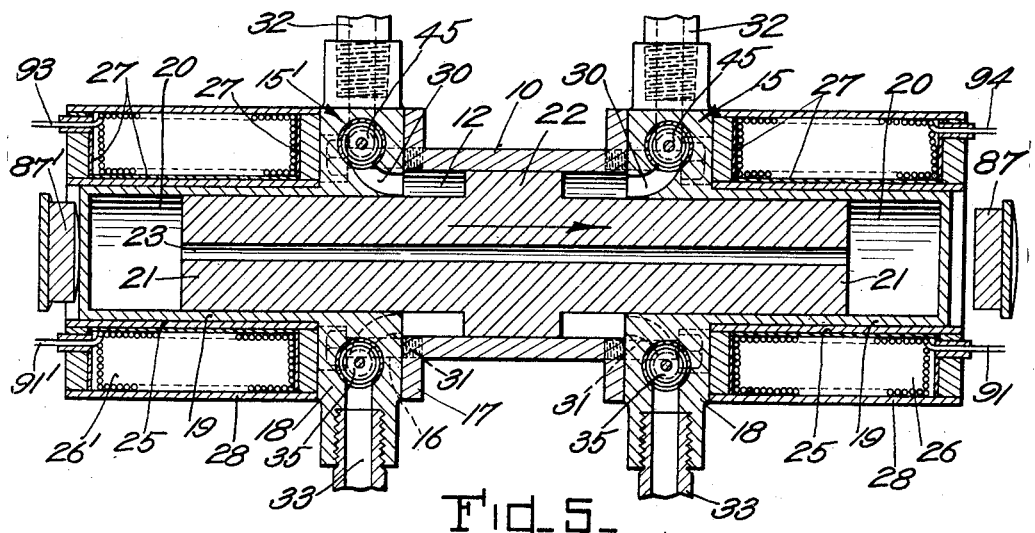
Fig. 5.
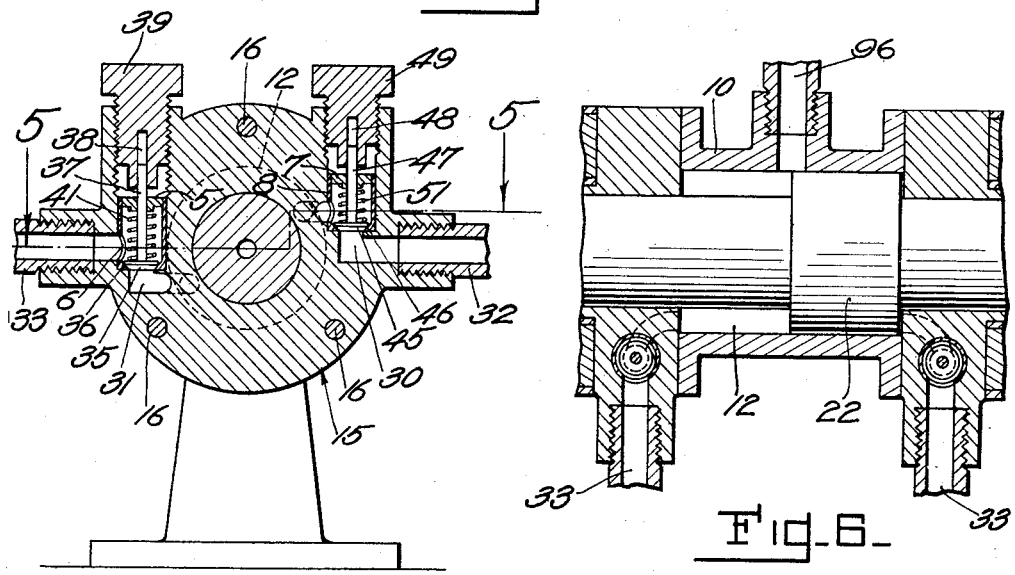
Fig. 4.
Fig. 6.
INVENTOR:
Harry H. Cobe,
by Meacham, Calvert, Copeland & Dike,
Attys.

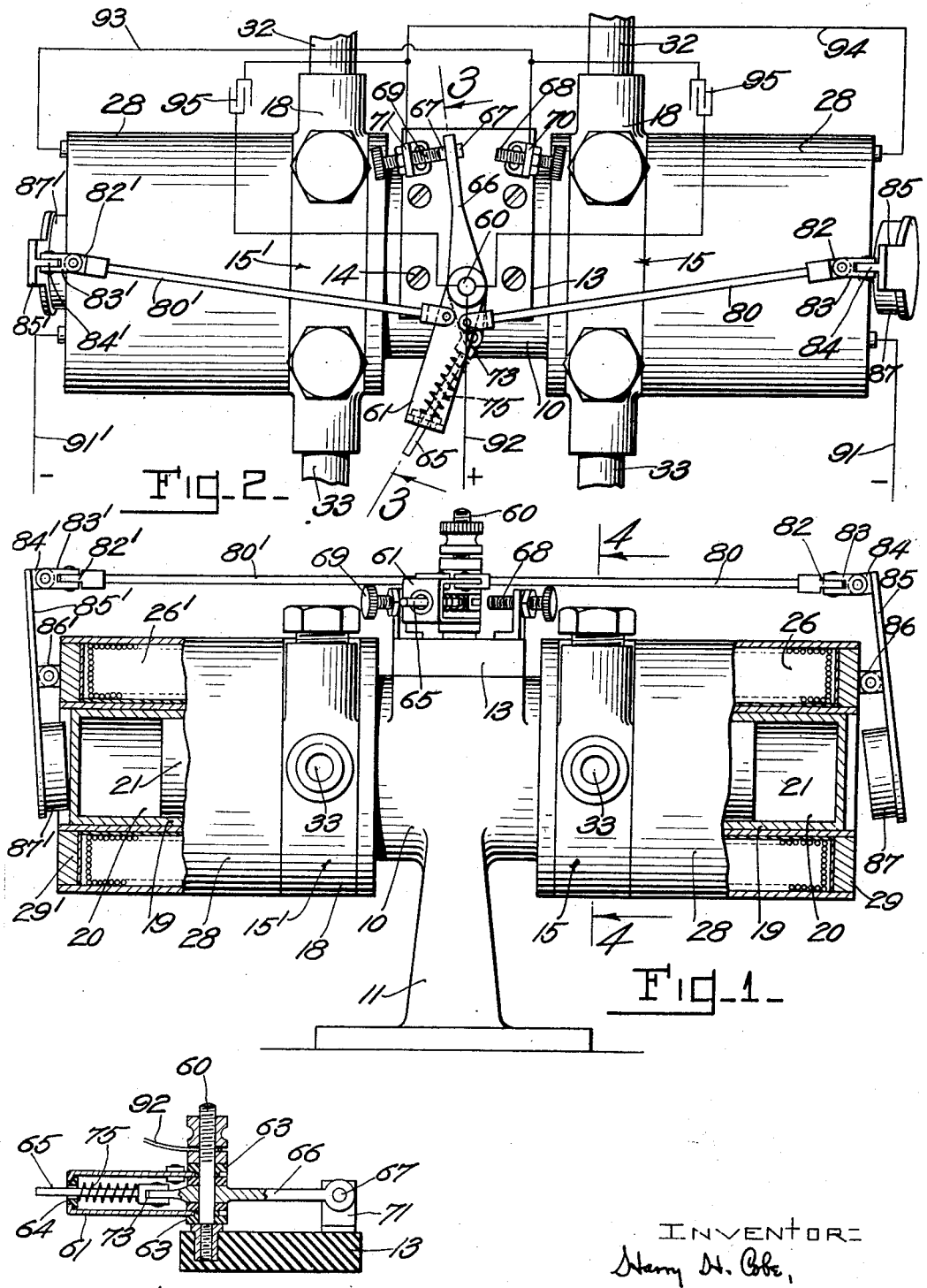

Patented May 5, 1931

1,804,376

UNITED STATES PATENT OFFICE

HARRY H. COBE, OF CHELSEA, MASSACHUSETTS, ASSIGNOR TO COBE ENGINEERING COMPANY, OF BOSTON, MASSACHUSETTS, A CORPORATION OF MASSACHUSETTS

ELECTROMAGNETIC RECIPROCATING MECHANISM

Application filed May 18, 1929. Serial No. 364,050.

This invention relates to electro-magnetic reciprocating mechanism especially, although not exclusively, applicable to pumps or compressors of the type employed in mechanical refrigerating systems, and is in the nature of an improvement on or modification of the mechanism disclosed and claimed in my prior application Serial No. 168,630, filed February 16, 1927.

The invention has for its general object to provide improved controlling means or switch mechanism for directing the flow of electric current to the electro-magnetic devices which operate the reciprocating element, said switch mechanism being separate from the reciprocating element, in the sense of having no direct mechanical connection therewith, and being operated solely by magnetic attraction induced by the movement of said reciprocating element with respect to said electro-magnetic devices. This principle of operation, while capable of other applications, is of particular utility in connection with a pump or compressor mechanism wherein the reciprocating element is in the form of a piston or equivalent compression element, since it permits the construction of a simple, inexpensive and efficiently operating pump wherein the compression element may be wholly enclosed within the cylinder or compression chamber and actuated in such a manner as to require no moving parts which extend from the interior to the exterior of the compression chamber, thereby eliminating packing difficulties.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawings; in which:

Fig. 1 is an elevation, partly broken away, of a pump embodying the invention.

Fig. 2 is a plan view of the same.

Fig. 3 is a sectional view of the switch taken upon the line 3—3, Fig. 2.

Figs. 4 and 5 are sectional views taken upon the line 4—4, Fig. 1 and the line 5—5, Fig. 4, respectively, and Fig. 6 is a fragmentary view of the pump embodying a modified valve construction.

The pump or compressor illustrated in the drawings as one embodiment of the invention comprises a cylinder casing 10 formed as an integral part of a support 11 and provided with a compression chamber 12. The outer surface of the casing 10 is provided with a flat portion to which a suitable block 13 of insulation is secured as by screws 14. The ends of the cylinder are entirely closed by heads 15 and 15' secured to the cylinder by bolts 16 engaging flanges 17 at the ends of the cylinder. Each cylinder head is formed with a relatively large portion 18 and a reduced central portion 19 (see Fig. 5). The cylinder heads are provided with axially alined bores 20 constituting guides for a pair of alined extensions or core members 21 projecting in opposite directions from the opposite faces of a piston 22, preferably of cold rolled steel. A by-pass opening 23 extends through the piston 22 and the piston extensions 21 so as to permit the flow of fluid between the bores 20 during movement of the piston. Preferably the cylinder heads are formed of suitable non-magnetic material, such as brass or bronze, and the reduced portion of each is surrounded by a sleeve 25 of brass or other non-magnetic material. Coils 26 and 26' of electro-magnetic devices or solenoids, preferably covered by paper 27, surround the reduced portions 19 of the right and left cylinder heads respectively as shown in Figs. 1 and 5, and are enclosed by sleeves 28, preferably, of cold rolled steel. The coils 26 and 26' are retained in position by annular discs 29 and 29' held between the sleeves 25 and 28 on each cylinder head.

An intake port 30 and an exhaust port 31 are formed in each enlarged portion 18 of the head and both communicate at one end with the compression chamber 12 and at their other ends with an intake line 32 and exhaust line 33, respectively. Spring pressed exhaust and intake valves are arranged so that the exhaust valve is opened against the action of its spring by the pressure within the compression chamber while the intake valve is opened against the tension of its spring by the pressure beyond said valve and the relatively reduced pressure within the compression chamber. In the form illustrated the head 35 of the exhaust valve (see Fig. 4) cooperates with a valve seat 36 at the outer end of the exhaust port 31 to close the exhaust port and is provided with a valve stem 37 extending into a bore 38 in a plug 39 in threaded engagement with the casing. A spring 41 surrounds the valve stem 37 with one end engaging the head 35 and its other end engaging a threaded plug 5 in a valve cage 6. The head 45 of the intake valve is arranged to cooperate with a valve seat 46 at the inner end of the intake line 32 to close the intake port 30 and is provided with a stem 47 extending into a bore 48 in a plug 49 in threaded engagement with the casing. A spring 51 surrounds the stem 47 with one end engaging the head 45 and the other end engaging a threaded plug 7 in a valve cage 8.

A suitable switch is provided for controlling the flow of current to the electro-magnetic devices 26 and 26' to reciprocate the piston in the compression chamber. In the embodiment illustrated a stud 60 is mounted in an upright position in the insulation block 13 (see Figs. 1, 2 and 3). A U-shaped arm 61 is provided with alined openings near its free ends, each containing a block 63 of insulating material having an opening adapted to receive the stud 60. A block 64 of insulating material is also provided in the base of the U-shaped arm 61 and is provided with an opening to receive a rod 65. A switch arm 66 is pivotally connected at an intermediate point to the stud 60 and is provided near one end with laterally projecting contacts 67 adapted to engage alternately the adjustable contacts 68 and 69 mounted in brackets 70 and 71, respectively, secured on the block 13. The other end of the switch arm 66 is pivotally connected to the forked end 73 of the rod 65. A compression spring 75 surrounds the rod 65 with one end engaging the block 64 and the other engaging the fork 73. Links 80 and 80' are each pivotally connected at one end to the arm 61 and are provided at their other ends with eyes 82 and 82' which are pivotally connected to one end of the forked links 83 and 83' respectively, the other ends of which are pivotally connected to lugs 84 and 84' on the arms 85 and 85'. The arms 85 and 85' are pivotally mounted upon lugs 86 and 86' on the discs 29 and 29'. The other ends of the arms 85 and 85' are provided with blocks 87 and 87' of magnetic material, constituting armatures.

The electro-magnetic devices 26 and 26' are connected with a suitable source (not shown) of electrical energy by conductors 91 and 91'. The stud 60 serves as a positive terminal and is connected with the source of electrical energy by a conductor 92. The circuit is completed through the switch arm 66 thence through either of the contacts 68 or 69. The contact 68 is connected by a conductor 93 with the electro-magnetic device 26' and the contact 69 is connected through conductor 94 to the electro-magnetic device 26. In order to avoid sparking a condenser 95 may be shunted across each circuit.

A modified valve construction is shown in Fig. 6 wherein a single intake port 96 is provided in the cylinder casing 10 located centrally thereof for supplying fluid to either side of the piston in the compression chamber.

In operation, when the switch arm 66 engages the contact 69, as shown in Fig. 2, the circuit is completed through the electro-magnetic device 26 at the right, thus energizing the same to set up a magnetic field within the same. The magnetic field thus induced attracts the piston extension or core member 21 to cause it to move axially within the bore 20 and thus move the piston 22 to the right within the compression chamber. As the piston 22 is thus moved, the entry of the portion 21 thereof into the bore 20 at the right increases the force of the magnetic field of the solenoid 26 and the magnetism of said piston itself, as well as causing the latter to approach the armature 87, thereby increasing the magnetic attractive force exerted upon said armature. Movement of the latter under such attractive force is, however, restrained by the spring 75 until the piston 22 nears the end of its stroke, whereupon said force becomes sufficient to overcome said spring, thereby permitting said armature to move, swinging the arm 61 toward the right. As the arm 61 swings past its dead centre relative to the switch arm 66, the compression spring 75 causes the switch arm 66 to move away from the contact 69 as shown in Fig. 2 and in turn engage the contact 68 as the piston reaches the end of its stroke. The circuit through the electro-magnetic device at the right as shown in Fig. 2 is then opened and the circuit closed through the electro-magnetic device at the left, thus setting up a magnetic field within the latter and causing the piston rod to be moved towards the left. When the piston rod has moved a predetermined distance, the magnetic field within the electromagnetic device, and the consequent magnetic attraction of the piston portion at the left for the armature 87′ is increased to such an extent as to move said armature, together with the arm 85′, and consequently actuate the switch arm 66 to reverse the switch.

It will thus be understood that the switch mechanism is so constructed that the reversal takes place when the piston has completed its stroke. In order to facilitate the operation of the switch, the piston and piston rods preferably are made of cold rolled steel in order that the magnetism may be quickly discharged so that one electro-magnetic device does not interfere with the action of the other.

What I claim is:

1. In an electro-magnetic reciprocating mechanism, in combination, a magnetic plunger, two solenoid windings for reciprocating said plunger, a switch mechanically separate from said plunger for directing the flow of electric current to said solenoids alternately, and means actuated by the magnetic attraction of said plunger for operating said switch.

2. In a pump, in combination, a cylinder, a piston therein, electro-magnetic means for reciprocating said piston in said cylinder, a switch for controlling the flow of current to said electro-magnetic means, and means actuated by the magnetic attraction of said piston for operating said switch.

3. In a pump, in combination, a compression chamber having an inlet and an outlet port, a compression element movable and entirely enclosed therein, electro-magnetic means for operating said element, a switch for controlling the flow of current to said electro-magnetic means, and means actuated by the magnetic attraction of said compression element for operating said switch.

4. In a pump, in combination, a pump cylinder having an inlet and an outlet port, a cylinder head entirely enclosing the cylinder, a piston within the cylinder, electro-magnetic means for reciprocating the piston, a switch for controlling the flow of current to said electro-magnetic means, and means actuated by the magnetic attraction of said piston for operating said switch.

5. In a pump, in combination, a pump cylinder having an inlet and an outlet port, a piston within the cylinder, a cylinder head entirely enclosing said cylinder, a solenoid coil surrounding a portion of said cylinder head, means for energizing the solenoid coil to move the piston, a switch for controlling the flow of electric current to said solenoid coil, and means actuated by the magnetic attraction of said piston for operating said switch.

6. In a pump, in combination, a cylinder, a piston therein, electro-magnetic means for reciprocating said piston in said cylinder, a switch for controlling the flow of current to said electro-magnetic means, means for increasing the magnetic field of said electro-magnetic means as said piston nears the end of its stroke, and an actuator for said switch actuated by said field when the same has been increased a predetermined amount.

7. In a pump, in combination, a cylinder, a piston therein, electro-magnetic means for reciprocating said piston in said cylinder, a switch for controlling the flow of current to said electro-magnetic means, means for increasing the magnetic field of said electro-magnetic means as said piston nears the end of its stroke, an actuator for said switch actuated by said field, and means for restraining the movement of said actuator until said field has been increased a predetermined amount.

8. In a pump, in combination, a cylinder, a piston within said cylinder, separate electro-magnetic devices for moving said piston in opposite directions, means for increasing the magnetic field of said devices as said piston nears the end of its stroke, a switch for controlling the current to said devices, and a movable member operatively associated with each of said devices and connected with said switch and moved by the magnetic field of said devices when the same has been increased a predetermined amount to move said switch to control the flow of current to said devices.

9. In a pump, in combination, a cylinder, a closure for each end of said cylinder having a bore communicating with said cylinder, a piston in said cylinder having oppositely extended portions guided in said bores, a solenoid winding surrounding each closure, a switch for controlling the flow of current to said windings, a movable member connected with said switch and moved by the action of the magnetic field of said windings when increased by the entrance thereinto of said extended portions a predetermined distance.

10. In a pump, in combination, a cylinder, a piston therein, electro-magnetic means for reciprocating said piston in said cylinder, a switch for controlling the flow of current to said electro-magnetic means including a pivoted conductor, means for increasing the magnetic field of said electro-magnetic means as said piston nears the end of its stroke, a movable member actuated by the electro-magnetic means, connections between said member and conductor, and means for restraining the movement of said member until said field has been increased a predetermined amount.

11. In a pump, in combination, a cylinder, a piston therein, electro-magnetic means for reciprocating said piston in said cylinder, a switch for controlling the flow of current to said electro-magnetic means including a pivoted conductor, means for increasing the magnetic field of said electro-magnetic means as said piston nears the end of its stroke, a movable member actuated by the electro-magnetic means, a pivoted arm, a link connecting said member and arm and a spring connecting said arm and conductor.

12. In a pump, in combination, a cylinder, a closure for each end of said cylinder having a bore communicating with said cylinder, a piston in said cylinder having oppositely extended portions guided in said bores, a solenoid winding surrounding each closure, a switch for controlling the flow of current to said windings including a pivoted conductor, a movable member moved by the magnetic field of either of said windings when increased by the entrance thereinto of said extended portions a predetermined distance, and connections between said member and conductor.

13. In a pump, in combination, a cylinder, a closure for each end of said cylinder having a bore communicating with said cylinder, a piston in said cylinder having oppositely extended portions guided in said bores, a solenoid winding surrounding each closure, a switch for controlling the flow of current to said windings including a pivoted conductor, a pivoted arm, a movable member moved by the magnetic field of either of said windings when increased by the entrance thereinto of said extended portions a predetermined distance, a link connecting said member and arm, and a spring connecting said arm and conductor.

In testimony whereof I affix my signature.

HARRY H. COBE.